US012694194B2

(12) United States Patent (10) Patent No.: US 12,694,194 B2
Moon et al. (45) Date of Patent: Jul. 28, 2026

(54) METHOD FOR FABRICATING PHOTOMASK LAYOUT AND METHOD FOR FABRICATING OF SEMICONDUCTOR DEVICE USING THE SAME

(71) Applicant: Samsung Electronics Co., Ltd., Suwon-si (KR)

(72) Inventors: Sung-Yong Moon, Seoul (KR); Won-Chan Lee, Hwaseong-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 886 days.

(21) Appl. No.: 17/963,263

(22) Filed: Oct. 11, 2022

(65) Prior Publication Data

US 2023/0244136 A1     Aug. 3, 2023

(30) Foreign Application Priority Data

Jan. 28, 2022    (KR) ......................... 10-2022-0013345

(51) Int. Cl.
| | |
|---|---|
| *G06F 30/398* | (2020.01) |
| *G03F 1/36* | (2012.01) |
| *G03F 1/70* | (2012.01) |
| *G03F 7/00* | (2006.01) |
| *G06F 30/30* | (2020.01) |
| *G06F 119/18* | (2020.01) |

(52) U.S. Cl.
CPC .............. *G06F 30/398* (2020.01); *G03F 1/36* (2013.01); *G03F 1/70* (2013.01); *G03F 7/70441* (2013.01); *G06F 2119/18* (2020.01)

(58) Field of Classification Search
None
See application file for complete search history.

(56) References Cited

U.S. PATENT DOCUMENTS

| | | | |
|---|---|---|---|
| 7,506,299 | B2 | 3/2009 | Socha et al. |
| 8,221,943 | B2 | 7/2012 | Wang et al. |
| 8,458,626 | B1 | 6/2013 | Tirapu-Azpiroz et al. |
| 8,881,069 | B1 | 11/2014 | Hamouda |
| 9,280,064 | B2 | 3/2016 | Engblom et al. |
| 9,627,202 | B2 | 4/2017 | Ha et al. |
| 10,153,162 | B2 | 12/2018 | Kim et al. |

(Continued)

FOREIGN PATENT DOCUMENTS

| | | |
|---|---|---|
| KR | 10-2010-0082307 A | 7/2010 |
| KR | 10-2012-0129178 A | 11/2012 |
| KR | 10-2020-0035303 A | 4/2020 |

OTHER PUBLICATIONS

Office Action in Korean Appln. No. 10-2022-0013345, mailed on Nov. 21, 2025, 17 pages (with English translation).

*Primary Examiner* — Leigh M Garbowski
(74) *Attorney, Agent, or Firm* — Fish & Richardson P.C.

(57) ABSTRACT

A method for fabricating a photomask layout is provided. The method includes: receiving a first layout including a main pattern; generating a second layout by generating an assist feature in consideration of optical properties of the main pattern in the first layout; generating a third layout by performing optical proximity correction (OPC) on a second layout; and outputting the third layout to a corrected layout when the assist feature is not generated on an ACI image of a semiconductor film etched by using a photomask generated using the third layout, as an etching mask.

19 Claims, 11 Drawing Sheets

(56) References Cited

U.S. PATENT DOCUMENTS

| | | | |
|---|---|---|---|
| 10,386,714 B2 | 8/2019 | Kohli et al. | |
| 10,395,936 B2 | 8/2019 | Mignot et al. | |
| 2007/0111112 A1* | 5/2007 | Huh | G03F 1/84 |
| | | | 430/5 |
| 2021/0334444 A1* | 10/2021 | Lee | G03F 7/70441 |

* cited by examiner

<u>1000</u>

IM    1400

| | |
|---|---|
| ☐ | Transparent |
| ▨ | Opaque |

P1

IM

1400

R

101

| | |
|---|---|
| —— | Target |
| ----- | Actual |

<u>34</u>

L1

L2

METHOD FOR FABRICATING PHOTOMASK LAYOUT AND METHOD FOR FABRICATING OF SEMICONDUCTOR DEVICE USING THE SAME

CROSS-REFERENCE TO RELATED APPLICATION

This application claims priority from Korean Patent Application No. 10-2022-0013345 filed on Jan. 28, 2022 in the Korean Intellectual Property Office, and all the benefits accruing therefrom under 35 U.S.C. 119, the contents of which in its entirety are herein incorporated by reference.

BACKGROUND

1. Technical Field

The present disclosure relates to a method for fabricating a photomask layout and a method for fabricating of a semiconductor device using the same.

2. Description of the Related Art

With the rapid development of the electronic industry in recent years, demand for electronic devices having higher performance, higher reliability, and smaller sizes is increasing. Electronic devices are implemented with semiconductor elements manufactured through a semiconductor manufacturing process. Therefore, in order to meet such demand, the structure of semiconductor devices has gradually become more complex and highly-integrated.

These semiconductor elements may be obtained through a photolithography process. In the process, a layout of various patterns is printed on a semiconductor wafer. However, with an increase in the integration of the semiconductor process, the gaps between the image patterns of masks become smaller. Such proximity may result in interference and diffraction of light, and cause a distorted layout different from the planned layout to be printed on the wafer.

To prevent the distortion of the layout, a resolution enhancement technology such as optical proximity correction (OPC) is used. However, in the case of performing the optical proximity correction on patterns having the same shape and the same peripheral condition, it may be important to perform the optical proximity correction by efficiently reducing the turnaround time (TAT).

SUMMARY

Technical aspects to be achieved through some embodiments of the present disclosure provide a method for fabricating a photomask layout with increased difficulty of optical proximity correction and improved difficulty of the process of manufacturing a photomask.

Technical aspects to be achieved through some embodiments of the present disclosure also provides a method for fabricating of a semiconductor device using the photomask layout with increased difficulty of optical proximity correction and improved difficulty of the process of manufacturing a photomask.

The technical aspects of the present disclosure are not restricted to those set forth herein, and other unmentioned technical aspects will be clearly understood by one of ordinary skill in the art to which the present disclosure pertains by referencing the detailed description of the present disclosure given below.

According to an aspect of the present disclosure, a method for fabricating a photomask layout includes: receiving a first layout of the photomask layout, the first layout including a main pattern; generating a second layout by generating an assist feature in consideration of optical properties of the main pattern in the first layout; generating a third layout by performing optical proximity correction (OPC) on the second layout; and outputting the third layout as a corrected layout when the assist feature is not generated on an after-cleaning inspection (ACI) image of a semiconductor film etched using a photomask, generated using the third layout, as an etching mask.

According to an aspect of the present disclosure, a method for fabricating a photomask layout includes: receiving a first layout including a unit block center region and a unit block edge region; determining a size and location of an assist feature in the unit block edge region of the first layout; generating a second layout by generating a sub-pattern having the determined size in the determined location; and generating a third layout by performing optical proximity correction (OPC) on the second layout.

According to an aspect of the present disclosure, a method for fabricating a photomask layout includes: receiving a first layout including a main pattern; generating a second layout by generating an assist feature around the main pattern in consideration of optical properties of the main pattern; generating a third layout by performing optical proximity correction (OPC) on the second layout; generating, via a simulation, an after-development inspection (ADI) image of a photomask generated using the third layout and an after-cleaning inspection (ACI) image of a semiconductor film etched using the photomask as an etching mask; generating a corrected layout by adjusting at least one of a size or a shape of the assist feature of the third layout; generating the photomask using the corrected layout; and forming the semiconductor device using the photomask.

BRIEF DESCRIPTION OF THE DRAWINGS

The above and other aspects and features of the present disclosure will become more apparent by describing in detail exemplary embodiments thereof with reference to the attached drawings, in which.

DETAILED DESCRIPTION OF THE EMBODIMENTS

Figure 1:
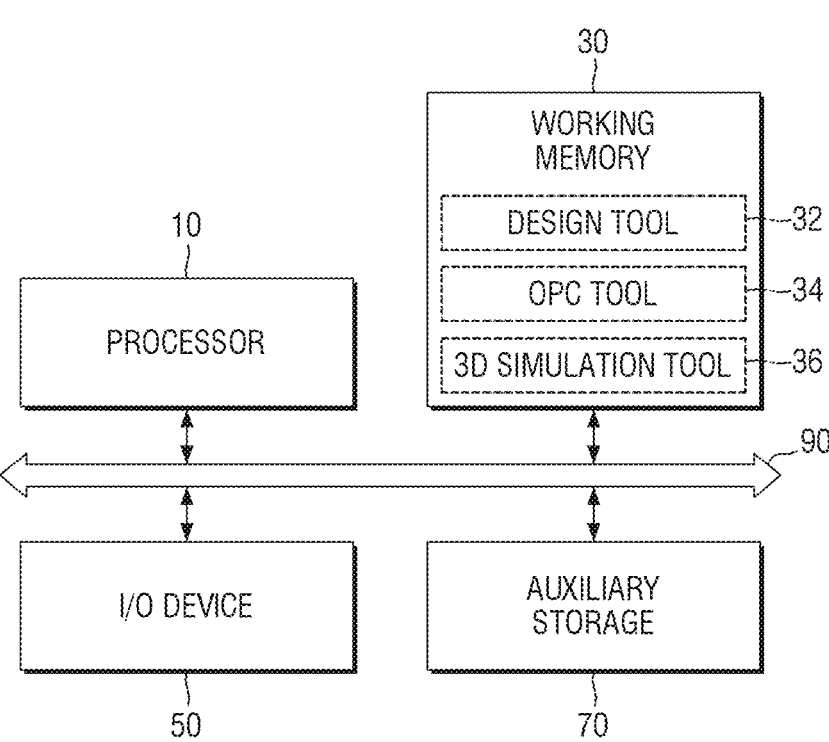
FIG. 1 is a block diagram explaining a computer system for performing semiconductor design according to some embodiments of the present disclosure.

Hereinafter, embodiments of the present disclosure will be described with reference to the attached drawings. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated.

Functional elements in the following description and the corresponding blocks shown in the drawings, unless indicated otherwise, may be implemented in processing circuitry such as hardware, software, or a combination thereof configured to perform a specific function. For example, the processing circuitry more specifically may include (and/or be included in), but is not limited to, a central processing unit (CPU), an arithmetic logic unit (ALU), a digital signal processor, a microcomputer, a field programmable gate array (FPGA), and programmable logic unit, a microprocessor, application-specific integrated circuit (ASIC), etc.

Although the terms "first," "second," "third," etc., may be used herein to describe various elements, components, regions, layers, and/or sections, these elements, components, regions, layers, and/or sections, should not be limited by these terms. These terms are only used to distinguish one element, component, region, layer, or section, from another region, layer, or section. Thus, a first element, component, region, layer, or section, discussed below may be termed a second element, component, region, layer, or section, without departing from the scope of this disclosure.

FIG. 1 is a block diagram for explaining a computer system for performing semiconductor design according to some embodiments of the present disclosure.

Referring to FIG. 1, the computer system for performing the semiconductor design according to some embodiments may include a processor 10, a working memory 30, an input/output device 50, and an auxiliary storage 70. Herein, the computer system may be provided as a dedicated device for layout design according to some embodiments. Furthermore, the computer system for performing the semiconductor design may include a variety of designs and verification simulation programs.

The processor 10 may execute software (application programs, operating systems (OS), device drivers, etc.) to be performed in the computer system for performing the semiconductor design. The processor 10 may execute the operating system (OS) loaded into the working memory 30. The processor 10 may execute a variety of application programs to be driven based on the operating system (OS). For example, the processor 10 may execute a layout design tool 32 loaded into the working memory 30.

The operating system (OS) and/or the application programs may be loaded into the working memory 30. When the computer system is booted, an OS image stored in the auxiliary storage 70 may be loaded into the working memory 30 based on a booting sequence. All input/output operations of the computer system may be supported by the operating system (OS). Likewise, the application programs may be selected by a user and/or loaded into the working memory to provide a basic service. The layout design tool for layout design according to some embodiments may also be loaded from the auxiliary storage 70 to the working memory 30.

The layout design tool 32 may have a bias function configured to change the shape and/or location of certain layout patterns differently from those defined by a design rule. For example, the layout design tool 32 may perform a design rule check (DRC) under a changed bias data condition.

The working memory 30 may be a volatile memory such as a static random-access memory (SRAM), a dynamic random-access memory (DRAM), etc. or a nonvolatile memory such as perfect RAM (PRAM), magnetic MRAM (MRAM), resistive ReRAM (ReRAM), Ferroelectric RAM (FRAM), a NOR flash memory, etc.

Furthermore, the working memory 30 may further include an OPC tool 34 configured to perform the optical proximity correction (OPC) for designed layout data and a three-dimensional (3D) simulation tool 36.

The input/output (I/O) device 50 receives and/or controls user input and output from user interface devices. For example, the input/output device 50 may include (or be connected to) a keyboard and/or a monitor to receive information from a designer and/or a screen and/or speaker to transmit information to the designer. The designer may receive information on semiconductor areas or data paths requiring adjusted operation properties by using the input/output device 50. In addition, a processing process and/or a processing result of the OPC tool 34 may be displayed via the input/output device 50.

The auxiliary storage 70 is provided as a storage medium of the computer system. The auxiliary storage 70 may store application programs, operating system images, and/or different kinds of data.

The auxiliary storage 70 may be provided as, e.g., a memory card (MMC, eMMC, SD, MicroSD, etc.) and/or a hard disk drive (HDD). The auxiliary storage 70 may include a NAND-type flash memory with a mass storage capacity. Alternatively, the auxiliary storage 70 may include a next-generation nonvolatile memory such as PRAM, MRAM, ReRAM, FRAM, a NOR flash memory, etc.

The system interconnector 90 may be a system bus configured to provide a network inside the computer system. The processor 10, the working memory 30, the input/output device 50, and the auxiliary storage 70 may be electrically connected to each other via the system interconnector 90 and may exchange data with each other. However, the configuration of the system interconnector 90 is not limited to the aforementioned description, and may further include mediation means for efficient management.

Figure 2:
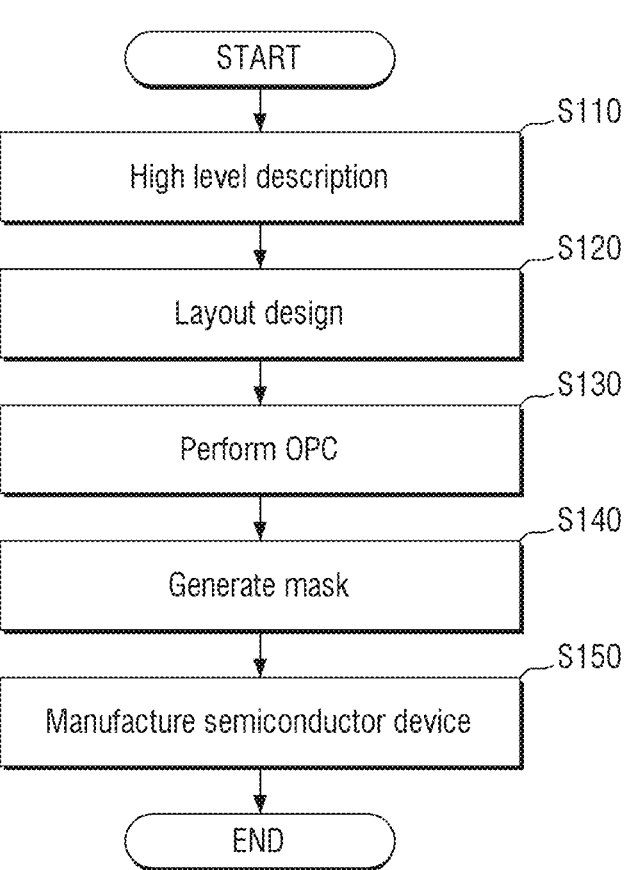
FIG. 2 is a flowchart explaining a method for designing and fabricating a semiconductor element according to some embodiments of the present disclosure.

FIG. 2 is a flowchart explaining a method for designing and fabricating a semiconductor element according to some embodiments of the present disclosure.

Referring to FIG. 2, a high-level design of a semiconductor integrated circuit may be performed (S110). The high-level design may refer to describing a design target integrated circuit in a high-level language of a computer language. For example, a high-level language such as a C language may be used. Circuits designed by the high-level design can be more specifically represented by a register transfer level (RTL) coding and/or simulation.

Furthermore, a code generated by the register transfer-level coding may be converted into a Netlist and synthesized into an entire semiconductor element. A synthesized schematic circuit may be verified by a simulation tool, and an adjusting process may be accompanied according to the verification result.

A layout design for implementing a logically completed semiconductor integrated circuit on a silicon substrate may be performed (S120). For example, the layout design may be performed with reference to a schematic circuit synthesized in the high-level design and/or a Netlist corresponding thereto. The layout design may include a routing procedure for placing and connecting a variety of standard cells provided in a cell library according to prescribed design rules.

The cell library for the layout design may include information on, e.g., operation, speed, and/or power consumption of a standard cell. The cell library for representing a circuit at a specific gate level as a layout is defined in most layout design tools. The layout may be a procedure for actually defining the shape or size of patterns for constituting transistors and metal wirings to be formed on the silicon substrate. For example, to actually form an inverter circuit on the silicon substrate, layout patterns such as PMOS, NMOS, N-WELL, a gate electrode, metal wirings, and/or the like to be disposed thereon may be properly arranged by the layout design tool. To this end, a suitable one (pattern) may be first searched and selected from inverters included in and/or pre-defined in the cell library.

Furthermore, the routing may be performed for the selected and placed standard cells. For example, routing with upper wirings may be performed on the selected and placed standard cells. The standard cells may be connected to each other according to the design via a routing procedure. Most of these series of steps may be performed automatically or passively by the layout design tool.

For example, the placement and routing of the standard cells may be automatically performed using a separate Place & Routing tool.

After the routing, verification of the layout may be performed on whether there are any violations of the design rule. The verification may include a design rule check (DRC) to verify whether the layout is properly corrected to fit into the design rule, an electronic rule check (ERC) to verify whether the layout is properly corrected without electrical interruption in the inside, and a layout vs schematic (LVS) to verify whether the layout is consistent with a gate level Netlist.

The optical proximity correction (OPC) may be performed (S130) on the layout design. Accordingly, a corrected layout may be formed. The layout patterns obtained via the layout design may be implemented on the silicon substrate via a photolithography process. In this case, the optical proximity correction may correct distortions that may occur in the photolithography process. For example, via the optical proximity correction, it is possible to correct distortion such as refraction and/or a process effect caused by the properties of light during exposure using the layout pattern. While performing the optical proximity correction, the shape and position of the designed layout patterns may be finely corrected (e.g., biased).

A photomask may be manufactured based on the corrected layout changed by the optical proximity correction (S140). For example, the photomask may be manufactured based on layout patterns using, e.g., a chromium film applied on a glass substrate.

The semiconductor element may be manufactured using the photomask (S150). A variety of exposure and etching steps may be repeated in the process of manufacturing the semiconductor element using the photomask. The exposure steps may also be referred to as development steps, and the etching steps may include etching the silicon substrate and cleaning the silicon substrate to remove the photomask. Through these steps, the shapes of the patterns configured during the layout design may be sequentially formed on the silicon substrate.

Figure 3:
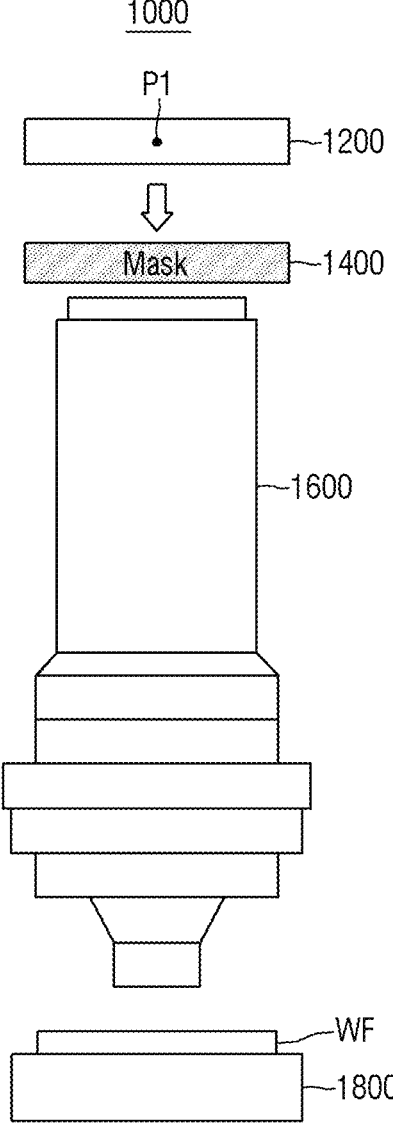
FIG. 3 is a view briefly explaining a photolithography system used to manufacture a mask.

FIG. 3 is a view briefly explaining a photolithography system used to manufacture a mask.

Referring to FIG. 3, the photolithography system 1000 may include a light source 1200, a photomask 1400, a reduction-projection device 1600, and a wafer stage 1800. However, the photolithography system 1000 may further include components not illustrated in FIG. 3. For example, the photolithography system 1000 may further include a sensor used to measure a height and/or slope of a surface of the wafer WF.

The light source 1200 may emit light. The light emitted by the light source 1200 may be irradiated to the photomask 1400. For example, the light source 1200 may include an ultraviolet light source (e.g., a KrF light source having a wavelength of 234 nm, an ArF light source having a wavelength of 193 nm, and/or the like). In some example embodiments, the light source 1200 may include a laser and/or the light source 1200 may further include a collimator. The collimator may convert the ultraviolet light into a parallel light (e.g., a collimated beam of ultraviolet light). The parallel light may be provided to the photomask 1400. For example, the collimator may include a dipole aperture and/or a quadruple aperture to increase a focal depth of the ultraviolet light.

The photomask 1400 may include image patterns used to print the layout on the wafer WF. The image patterns may be formed of a transparent region and an opaque region. The transparent region may be formed by etching a metal layer on the photomask 1400. The transparent region may transmit light emitted by the light source 1200, and the opaque region may not transmit the light. The photomask 1400 may be manufactured according to the method for generating a photomask layout according to some embodiments.

The reduction-projection device 1600 may receive light transmitted through (e.g., penetrating) the transparent region of the photomask 1400. The reduction-projection device 1600 may match circuit patterns of the layout to be printed on the wafer WF with image patterns of the photomask 1400. The reduction-projection device 1600 may, for example, include mirrors and/or lens configured to direct, focus, and/or reduce the light projected from the light source 1200 and/or through the mask 1400. The wafer stage 1800 may support the wafer WF.

The transparent region included in the image patterns of the photomask 1400 may transmit the light emitted by the light source 1200. The light penetrating the photomask 1400 may be irradiated to the wafer WF via the reduction-projection device 1600. As a result, the layout including the circuit patterns corresponding to the image patterns of the photomask 1400 may be printed on the wafer WF.

However, with an increase in integration of the semiconductor process, the gaps and/or critical dimensions (CD) between the image patterns of the photomask 1400 becomes smaller and the width of the transparent region becomes much narrower. Such proximity may result in interference and diffraction of light, and cause a distorted layout different from a planned layout to be printed on the wafer. When the distorted layout is printed on the wafer WF, the designed circuit may operate abnormally.

A resolution enhancement technology is used to prevent the distortion of the layout. The optical proximity correction is an example of the resolution enhancement technology. By light proximity correction, the degree of distortion such as interference and diffraction of light is predicted in advance. Furthermore, based on the predicted result, the image patterns to be formed on the photomask 1400 are biased in advance. As a result, the planned layout may be printed on the wafer WF.

Figure 4:
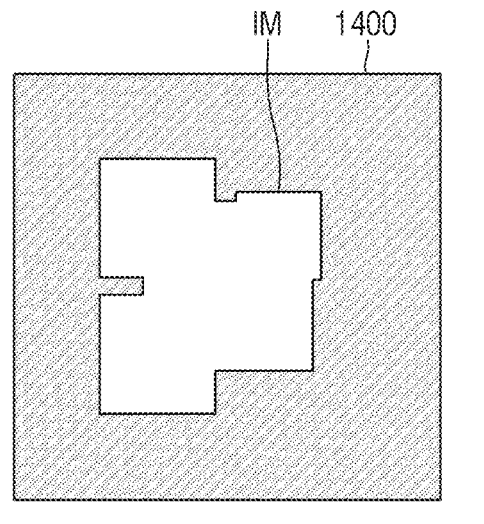
FIG. 4 is a view explaining a photomask manufactured based on a corrected layout.

FIG. 4 is a view explaining a photomask manufactured based on a corrected layout. FIG. 4 is a view illustrating an example result of the step S140 in FIG. 2.

Referring to FIG. 4, the photomask 1400 may include an image pattern IM corresponding to a correction pattern. The photomask 1400 may include the transparent region and the opaque region. The opaque region may interrupt (e.g., block) some of the light transmitted to the photomask 1400 (e.g., without transmitting the light), while the transparent region may transmit light emitted from the light source 1200 in FIG. 3. The light penetrating the photomask 1400 may be irradiated onto a substrate 101 in FIG. 3. For example, in the case of a photolithography process using a negative photoresist, the image pattern IM may be a transparent region of the photomask 1400.

Figure 5:
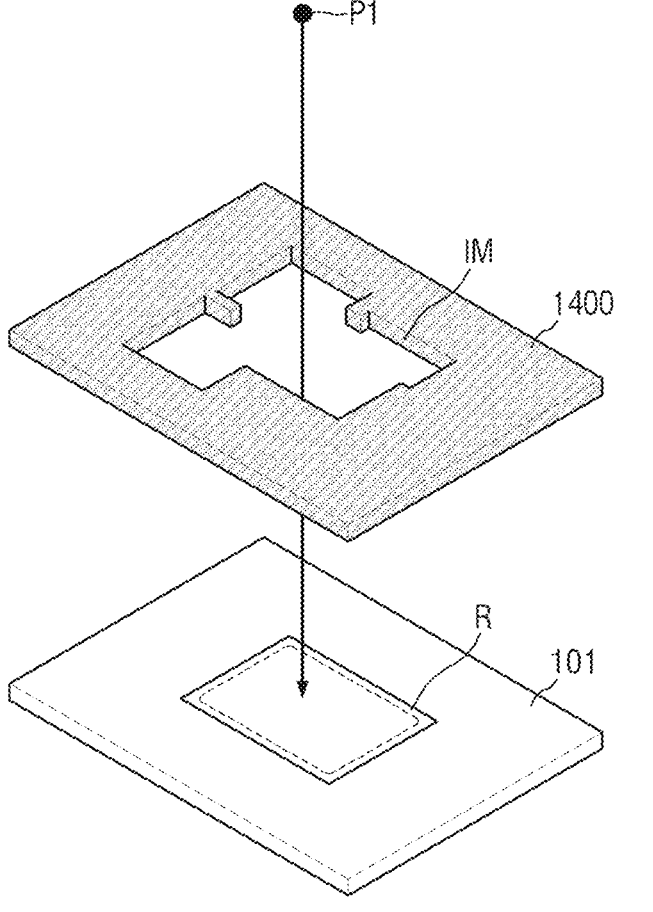
FIG. 5 is a view explaining printing a circuit pattern on a substrate using the photomask in FIG. 4.

FIG. 5 is a view explaining printing a circuit pattern on a substrate using the photomask in FIG. 4.

Referring to FIG. 5, a point light source P1 of the light source 1200 in FIG. 3 may emit light to the photomask 1400. The emitted light may penetrate the transparent region of the image pattern IM and be irradiated onto a photoresist (e.g., a negative photoresist and/or a positive resist) on the substrate 101 (e.g., in an exposure process). In some example embodiments, an area where the light is irradiated on the negative photoresist may remain, and an area where the light is not irradiated may be removed (e.g., in a development process); and/or an area where the light is not irradiated on the positive photoresist may remain and an area where the light is irradiated may be removed (e.g., in the development process). A portion of the substrate 101 exposed by the developed photomask may be etched (e.g., in an etching process) and the etched substrate 101 may be cleaned (e.g., in a cleaning process). Accordingly, the circuit pattern R corresponding to the image pattern IM may be printed on the substrate 101.

An actual pattern indicated by a dotted line may be printed on the substrate 101. The actual pattern may have markedly the same shape and size as a target pattern indicated by a solid line. In conclusion, an error between the actual pattern and the target pattern may be minimized through the optical proximity correction.

Figure 6:
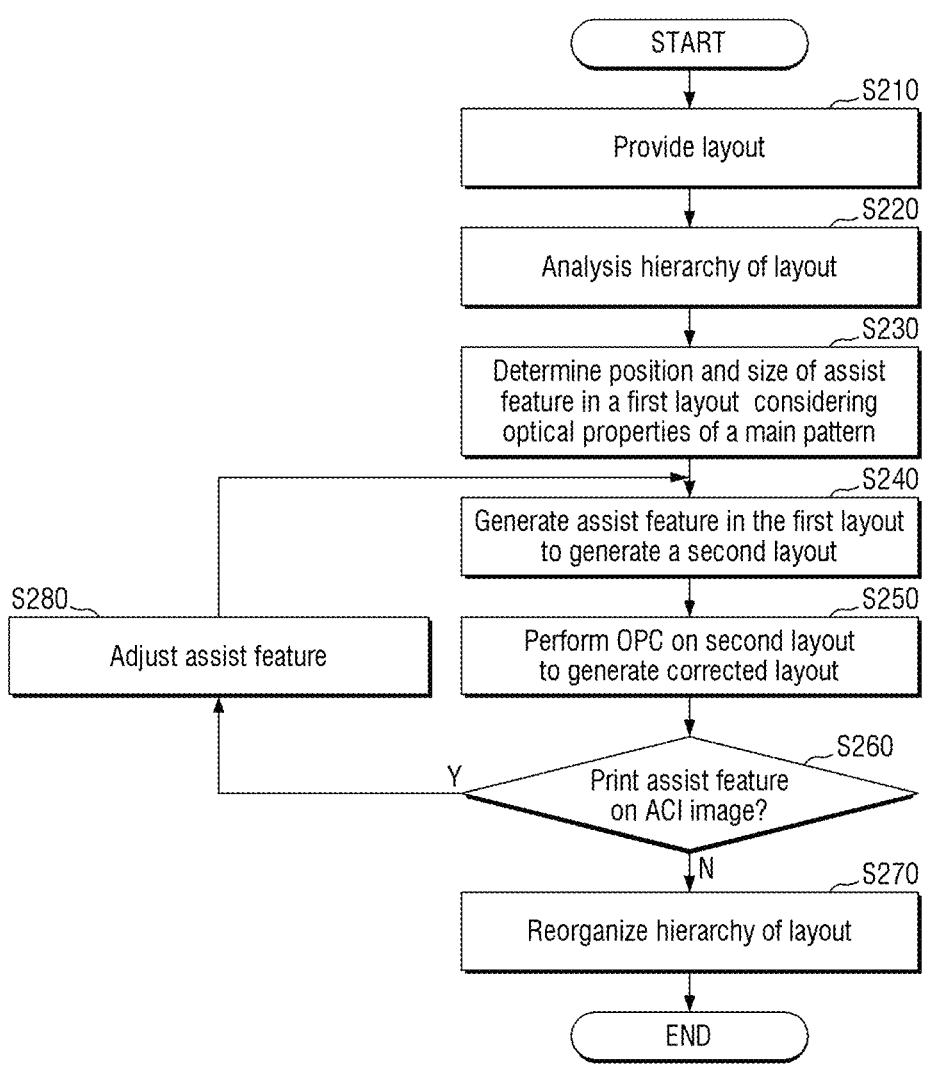
FIG. 6 is a flowchart explaining a method for generating a photomask layout according to some embodiments of the present disclosure.
Figure 7:
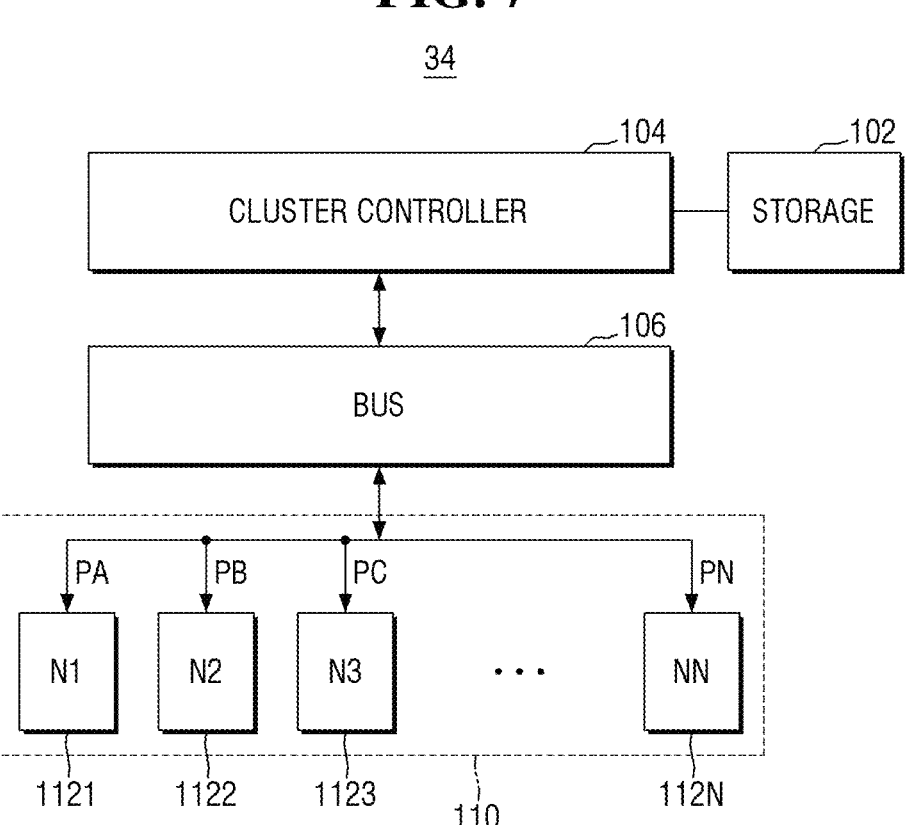
FIG. 7 is a block diagram explaining an OPC tool.
Figure 8:
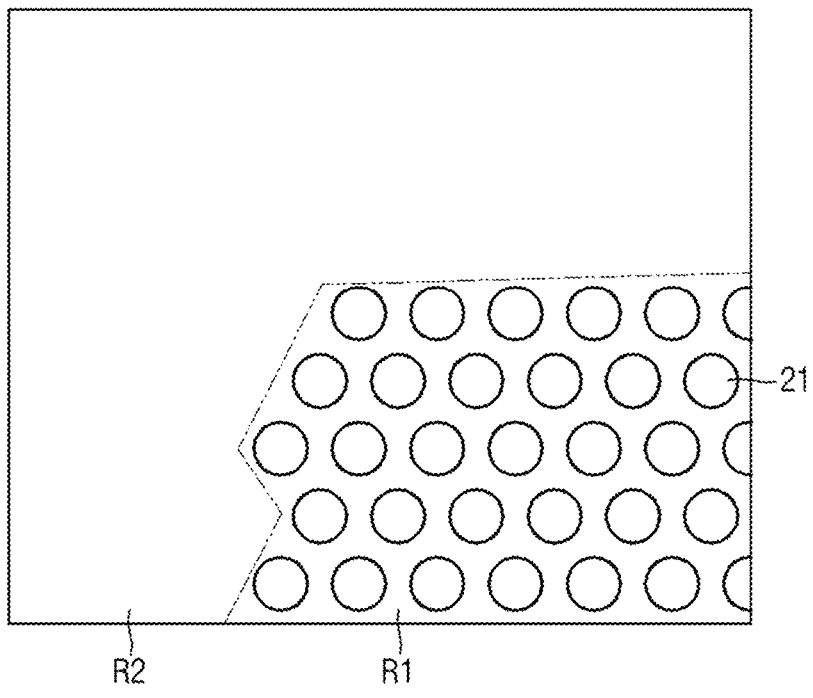
FIG. 8 is a view explaining a first layout.
Figure 9:
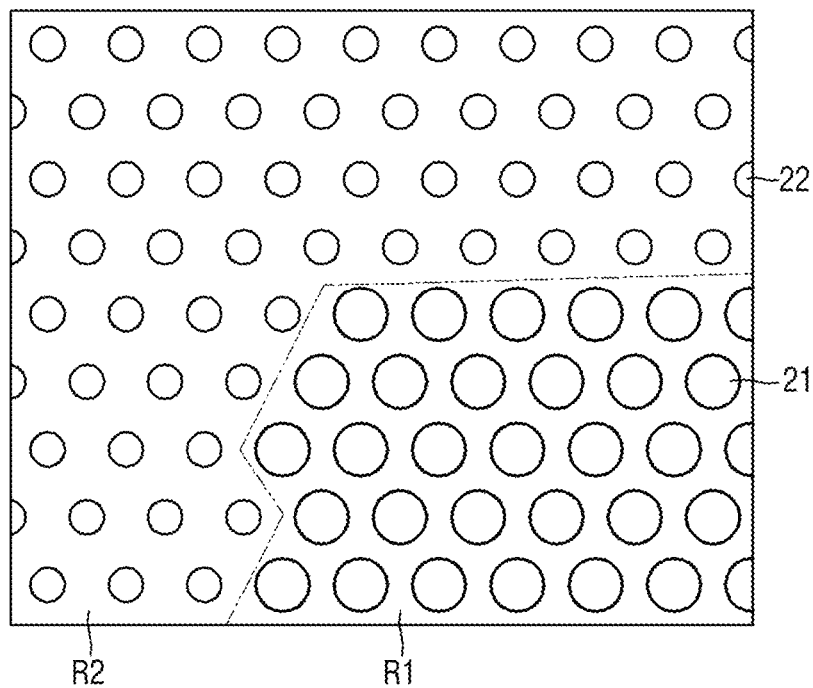
FIG. 9 is a view explaining a second layout.

FIG. 6 is a flowchart explaining a method for generating a photomask layout according to some embodiments of the present disclosure. FIG. 7 is a block diagram explaining an OPC tool. FIG. 8 is a view explaining a first layout. FIG. 9 is a view explaining a second layout.

Referring to FIG. 6, a designed layout may be provided (S210). The layout may be, for example, a layout generated in the step S120 in FIG. 2.

A hierarchy of the layout may be analyzed (S220). Analyzing the hierarchy of the layout may refer to analyzing the layout to extract and/or reconfigure the layout to undergo OPC.

For example, referring to FIG. 7, the OPC tool 34 may include a data storage device 102, a cluster controller 104, a bus 106, and a processing system 110.

The processing system 110 may include a plurality of nodes N1, N2, N3, . . . , NN (1121, 1122, 1123, . . . , where N is a natural number of two or more). In one embodiment, the plurality of nodes 1121 to 112N may be processor cores that perform arithmetic processing. In another embodiment, the plurality of nodes 1121 to 112N may be modules and/or functions in software.

In another embodiment, the plurality of nodes 1121 to 112N may be special-purpose circuits that perform OPC arithmetic operations. In some example embodiments, the bus 106 and/or the processing system 110 may be, respectively, associated with (and/or included in) the bus 90 and/or the processor 10 of FIG. 1.

Using the OPC tool 34, the design layout may be divided into a plurality of patches PA, PB, PC, . . . , and PN (wherein N represents an integer). For example, the OPC tool 34 may be used to read and analyze a design hierarchy from layout design data provided by the data storage device 102. Then, the design layout may be divided into the plurality of patches PA to PN according to the type of unit elements and a proximity effect environment. The plurality of patches PA to PN may be divided into sizes capable of being provided to and/or processed by the plurality of nodes 1121 to 112N of the OPC tool 34, respectively. For example, each of the plurality of patches PA to PN may be basic units for performing the optical proximity correction.

A division criterion into a plurality of patches PA to PN may include two-dimensional data such as geometry information of the layout included in each of the plurality of patches PA to PN, for example, a polygonal shape of the circuit pattern, a length of an edge of the circuit pattern, a size of the circuit pattern, a ratio of the circuit pattern part to the space part, and/or the like.

Each of the plurality of patches PA to PN may be formed of a rectangular area (and/or polygonal area) having an arbitrary size according to a value set by the user. The plurality of patches PA to PN may have different shapes and sizes. Each of the plurality of patches PA to PN may define one area of the circuit patterns to be printed later on the substrate. For example, at least one part of the substrate may be rectangular, and a length of one side thereof may be about 1 micrometer (µm) to about 99 micrometers (µm). However, as described above, the size may vary according to the value set by the user.

The plurality of patches PA to PN may be provided respectively to the plurality of nodes 1121 to 112N of the processing system 110 via the bus 106 from the cluster controller 104. The optical proximity correction may be performed independently and/or in parallel to each of the plurality of patches PA to PN using the plurality of nodes 1121 to 112N. Accordingly, the total turnaround time (TAT) required to perform the light proximity correction may be reduced.

According to embodiments, some and/or all of the OPC tool 34 may be implemented in the form of hardware, and/or may be implemented in the form of software (e.g., a program) and stored in the storage device.

Meanwhile, a layout pattern division method, an optical proximity correction method, an apparatus, and/or a system according to some embodiments of the present invention may be implemented in the form of a product including a computer-readable program code stored in a computer-readable medium. The computer-readable program code may be provided to a variety of computers or processors of other data processing devices. The computer-readable medium may be a computer-readable signal medium or a computer-readable recording medium.

The computer readable media may be, for example, a non-transitor computer readable media. The term "non-transitory," as used herein, is a description of the medium itself (e.g., as tangible, and not a signal) as opposed to a limitation on data storage persistency (e.g., RAM vs. ROM).

For example, the computer-readable recording medium may be any tangible medium that can store or include the program in or connected to an instruction execution system, equipment, or device.

Referring to FIGS. 6 and 8, a location and size of the assist feature in a first layout L1 may be determined in consideration of the optical properties of the main pattern 21 (S230). Herein, the first layout L1 is one of the patches PA to PN generated in the step S210. The step S230 may be performed by the OPC tool 34 in FIG. 1.

The first layout L1 may include a unit block center region R1 and a unit block edge region R2. The unit block center region R1 may include a main pattern 21 for the printing of the integrated circuit on the wafer. The main pattern 21 may define a planar shape of cell patterns to be formed in a cell array region of the wafer. The first layout L1 may include data in an appropriate format, such as, graphic design system (GDS) stream format and/or the like.

In this case, the location of the assist feature may be determined in the unit block edge region R2 of the first layout L1.

The location and size of the assist feature may be determined in consideration of the optical properties of the main pattern 21 when the assist feature is generated in the first layout L1.

The optical properties may include at least one of a mask error enhancement factor (MEEF) and/or a normalized image log slope (NILS).

The optical properties may further include, for example, at least one of a depth of focus at specific exposure later, an exposure later at specific depth of focus, a process variation band and/or critical dimension (CD) variation, an image log slope, and/or the like.

Referring to FIGS. 6 and 9, the second layout L2 may be generated by generating the assist feature 22 having a size determined in the step S230 within the first layout L1 (in FIG. 8) (S240). For example, the second layout L2 may include the assist feature 22 formed in the unit block edge region R2. The assist feature 22 may, for example, include a pattern to be formed on the photoresist, which may allow for similar environments and/or conditions, e.g., during the etching of the unit block edge region and the unit block center region. The second layout may be a target layout of a photoresist pattern to be obtained during after-development inspection (ADI). The step S240 may be performed by the OPC tool 34 in FIG. 1.

Referring to FIG. 6, the OPC may be performed for the second layout to generate the corrected layout (S250). The step S250 may be performed by the OPC tool 34 in FIG. 1 (and/or FIG. 7).

It may be determined whether the assist feature 22 is printed on an image (ACI image) obtained during after-cleaning inspection (ACI) (S260) The ACI image may be an image of a semiconductor film etched by using a photomask generated based on the corrected layout generated in the step S250 as an etching mask. The ACI image may be obtained by the 3D simulation tool 36 in FIG. 1. The step S260 may be performed by the OPC tool 34 in FIG. 1 (and/or FIG. 7).

When the assist feature is printed on the ACI image in the step S260, the assist feature may be adjusted (S280). At least one of the shape and size of the assist feature may be adjusted. For example, when the assist feature is printed on the ACI image, the size of the assist feature may be reduced. The step S280 may be performed by the OPC tool 34 in FIG. 1 (and/or FIG. 7), which may be followed by the step S240.

When the assist feature is not printed on the ACI image in the step S260, the hierarchy of the corrected layout may be reconstructed (S270). For example, the step S260 may be performed by the OPC tool 34 in FIG. 1 (and/or FIG. 7), which may be followed by the step S140 in FIG. 2 if the assist feature is not in the ACI image.

Figure 10:
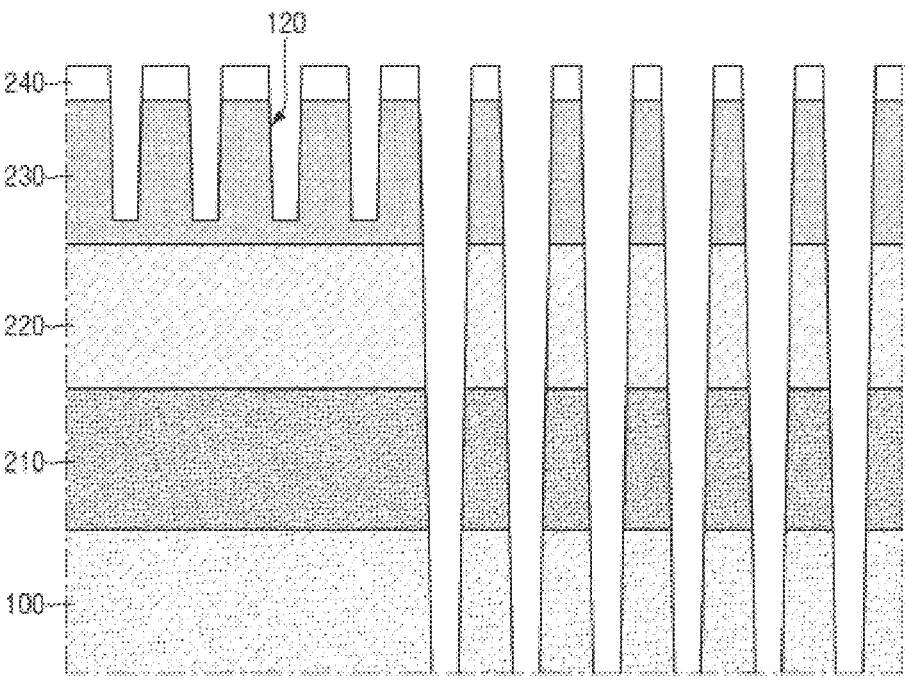
FIG. 10 is a sectional view illustrating a 3D simulation result generated by a 3D simulation tool.

FIG. 10 is a sectional view illustrating a 3D simulation result generated by a 3D simulation tool. The 3D simulation tool may be, for example, the 3D simulation tool 36 of FIG. 1.

Referring to FIGS. 1 and 10, the photoresist patterns may include a plurality of layers 210, 220, 230, and 240. A 3D simulation tool 36 may generate a 3D simulation result according to materials of each of the set layers 210, 220, 230, and 240, thicknesses of each of the layers 210, 220, 230, and 240, and an aspect ratio of the photoresist patterns 210, 220, 230, and 240.

The semiconductor film 100 may be etched using the photoresist patterns 210, 220, 230, and 240 generated based on the corrected layout as etching masks.

Some of the photoresist patterns 210, 220, 230, and 240 may include a pattern 120 corresponding to the assist feature 22 (of FIG. 9), and others may not include a pattern 120 corresponding to the assist feature 22. The assist feature 22 may be partially printed on the photoresist patterns 210, 220, 230, and 240 but may not be printed on the semiconductor film 100 (e.g., a final structure).

For example, a fourth photoresist pattern 240 may include a pattern 120 corresponding to the assist feature 22. The assist feature may be printed on the ADI image that is an image of the fourth photoresist pattern 240. A third photoresist pattern 230 may include a pattern 120 corresponding to the assist feature 22. The assist feature may be printed on an ACI image that is an image of the third photoresist pattern 230. A second photoresist pattern 220 and a first photoresist pattern 210 may not include the pattern 120 corresponding to the assist feature 22. The assist feature may not be printed on the ACI image that is an image of the second photoresist pattern 220 and the ACI image that is an image of the first photoresist pattern 210. The semiconductor film 100 may not include the pattern 120 corresponding to the assist feature 22. The assist feature may not be printed on the ACI image that is an image of the semiconductor film 100.

Figure 11:
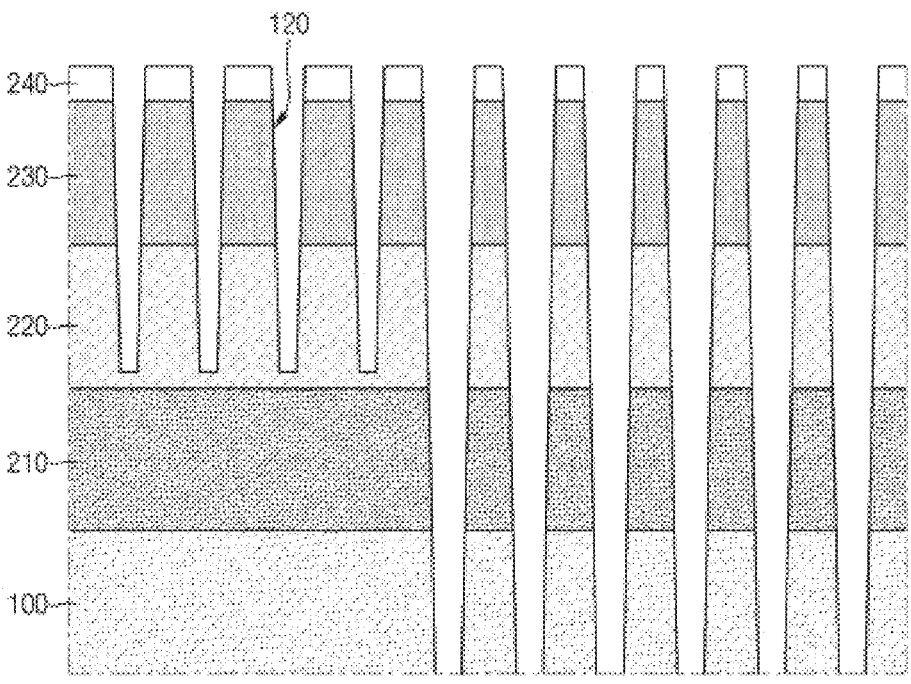
FIG. 11 is a sectional view illustrating a 3D simulation result generated by a 3D simulation tool.

FIG. 11 is a sectional view illustrating a 3D simulation result generated by a 3D simulation tool in FIG. 1. For convenience of explanation, a difference from FIG. 10 will be described.

Referring to FIG. 11, the fourth photoresist pattern 240 may include the pattern 120 corresponding to the assist feature 22. The assist feature may be printed on the ADI image that is the image of the fourth photoresist pattern 240. The third photoresist pattern 230 and the second photoresist pattern 220 may include the pattern 120 corresponding to the assist feature 22. The assist feature may be printed on the ACI image that is the image of the third photoresist pattern 230 and the ACI image that is the image of the second photoresist pattern 220. The first photoresist pattern 210 may not include the pattern 120 corresponding to the assist feature 22. The assist feature may not be printed on the ACI image that is the image of the first photoresist pattern 210. The semiconductor film 100 may not include the pattern 120 corresponding to the assist feature 22. The assist feature may not be printed on the ACI image that is the image of the semiconductor film 100.

The performance of the light proximity correction may lead to improvement of a critical dimension (CD) of the main pattern 21 of the unit block center region (R1 in FIGS. 8 and 9), but may cause optical degradation (e.g., NILS and/or MEEF) of the unit block edge region R2. In addition, environments of the block edge region (R2) and the unit block center region (R1) are different, which causes an increase in process difficulty during etching the pattern of the unit block center region.

In addition, sub-resolution assist features (SRAF) can be added to the main pattern of the photomask to improve contrast and sharpness of the main pattern projected onto the wafer. For example, the SRAF may be placed in proximity to the OPC features to improve the contrast and the sharpness of the main pattern and/or to reduce optical distortions. Unlike the assist features formed in the unit block edge region R2, the SRAF may be configured such that some (and/or none) of the SRAF are developed on to the ADI pattern. Since the SRAF may be not formed in the ADI pattern, the process difficulty may not be improved during etching the pattern of the unit block center region due to, e.g., a lack of similarity between the unit block center region and the SRAF formed in the ADI pattern.

In contrast, in the method of fabricating a photomask layout according to some embodiments, the assist feature is formed in the unit block edge region R2 in consideration of optical performance of the main pattern. Accordingly, the optical performance may be improved and/or enhanced.

In addition, the assist feature is formed in the unit block edge region, which is printed on the ADI image, but is not on the ACI image. Therefore, since the environments of the unit block edge region and the unit block center region are similar to each other, the difficulty of the optical proximity correction may be reduced, thereby improving the process difficulty during etching the pattern of the unit block center region.

Figure 12:
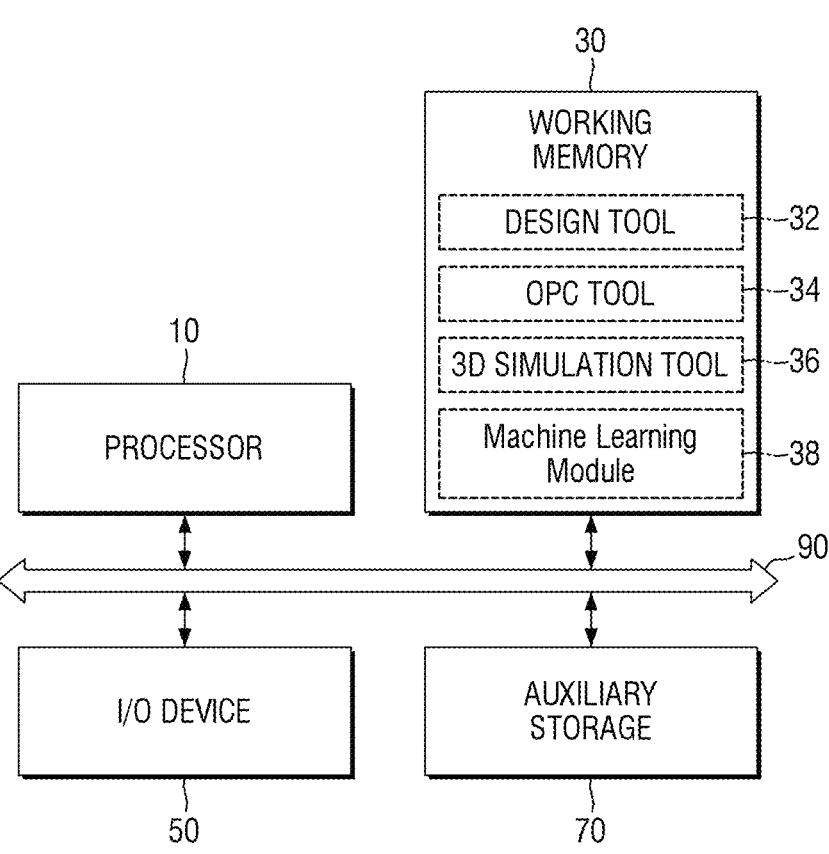
FIG. 12 is a block diagram explaining a computer system for performing semiconductor design according to some embodiments of the present disclosure.

FIG. 12 is a block diagram explaining a computer system for performing semiconductor design according to some embodiments of the present disclosure. For convenience of explanation, a difference from FIG. 1 will be described.

Referring to FIG. 12, the computer system for designing a semiconductor according to some embodiments may further execute a machine learning module 38. The machine learning module 38 may generate a layout for manufacturing a semiconductor element based on machine learning. For example, the step S230 in FIG. 6 may be performed by the machine learning module 38. The machine learning module 38 may include at least one of various kinds of neural networks such as a convolution neural network (CNN), a region with CNN (R-CNN), a region proposal network (RPN), a recurrent neural network (RNN), a stacking-based deep neural network (S-DNN), a state-space dynamic neural network (S-SDNN), a deconvolution network, a deep belief network (DBN), a restricted Boltzmann machine (RBM), a fully convolutional network, a long short-term memory (LSTM) network, a classification network, a Bayesian Neural Network (BNN) and/or the like. Additionally (and/or alternatively), the deep learning model(s) may be trained based on at least one of various algorithms such as regression, linear and/or logistic regression, random forest, a support vector machine (SVM), and/or other types of models, such as statistical clustering, Bayesian classification, decision trees, dimensionality reduction such as principal component analysis, expert systems, combinations thereof including ensembles such as random forests, and/or the like.

For example, the machine learning module 38 may be loaded into the working memory 30, but is not limited thereto. The machine learning module 38 may be implemented in the form of a command (or code) executed by the processor 10.

Furthermore, in some example embodiments, the processor 10 may be produced to implement the machine learning module 38. For example, the processor 10 may include processing circuitry configured to execute the machine learning module 38 stored in the working memory 38. For example, the processor 10 may be (and/or include) at least one of central processing unit (CPU), an application processor (AP), a neural processing unit (NPU), a neuromorphic processor (NP), a graphics processing unit (GPU), and/or the like.

Although some example embodiments of the present disclosure have been described above with reference to the accompanying drawings, the present disclosure is not limited to the embodiments described above, but may be manufactured in many different forms. It will be understood by those skilled in the art that the present disclosure may implemented in other specific forms without changing the technical spirit or essential features of the present disclosure. Therefore, it should be understood that the embodiments described above are examples in all respects and not restrictive.

The invention claimed is:

1. A method for fabricating a photomask layout, comprising:
   receiving a first layout of the photomask layout, the first layout including a main pattern;
   generating a second layout by generating an assist feature in consideration of optical properties of the main pattern in the first layout;
   generating a third layout by performing optical proximity correction on the second layout;
   generating a photomask including at least a first layer, a second layer on the first layer, and a third layer on the second layer by using the third layout;
   generating an after-development inspection (ADI) image of the first layer;
   generating an after-cleaning inspection (ACI) image of the second layer;
   generating an ACI image of the third layer;
   adjusting a size of the assist feature based on the assist feature being generated based on the ACI image of the third layer; and
   outputting the third layout as a corrected layout based on the assist feature not being generated on an ACI image of a semiconductor film etched using the photomask, the photomask being generated using the third layout as an etching mask.

2. The method for fabricating the photomask layout of claim 1, wherein the assist feature is generated on an ADI image of the photomask generated using the third layout.

3. The method for fabricating the photomask layout of claim 1, further comprising:
   adjusting the second layout by reducing a size of the assist feature based on the assist feature being generated on the ACI image of the semiconductor film.

4. The method for fabricating the photomask layout of claim 1, further comprising:
   adjusting the second layout by changing a shape of the assist feature based on the assist feature being generated on the ACI image of the semiconductor film.

5. The method for fabricating the photomask layout of claim 1, wherein the optical properties include at least one of a normalized image log slope or a mask error enhancement factor.

6. The method for fabricating the photomask layout of claim 1, wherein the first layout includes a unit block edge region and a unit block center region, the unit block center region including the main pattern, and the assist feature is generated in the unit block edge region.

7. The method for fabricating the photomask layout of claim 1, wherein the generating the second layout by generating the assist feature is performed by a machine learning model.

8. The method for fabricating the photomask layout of claim 1, wherein the corrected layout is generated by further considering at least one of a thickness of the photomask or an aspect ratio of the photomask.

9. A method for fabricating a photomask layout, comprising:

receiving a first layout including a unit block center region and a unit block edge region;

determining a size and a location of an assist feature in the unit block edge region;

generating a second layout by generating a sub-pattern having the determined size in the determined location;

generating a third layout by performing optical proximity correction on the second layout;

generating a photomask including at least a first layer, a second layer on the first layer, and a third layer on the second layer by using the third layout;

generating an after-development inspection (ADI) image of the first layer;

generating an after-cleaning inspection (ACI) image of the second layer;

generating an ACI image of the third layer; and adjusting the size of the assist feature based on the assist feature being generated based on the ACI image of the third layer.

10. The method for fabricating the photomask layout of claim 9, wherein the first layout includes a main pattern in the unit block center region; and the determining of the location of the assist feature includes determining the location of the assist feature in consideration of optical properties of the main pattern.

11. The method for fabricating the photomask layout of claim 10, wherein the optical properties include at least one of a normalized image log slope or a mask error enhancement factor.

12. The method for fabricating the photomask layout of claim 9, wherein the determining of the size and the location of the assist feature in the unit block edge region of the first layout is performed by a machine learning model.

13. The method for fabricating the photomask layout of claim 9, further comprising:

generating an ADI image of the photomask using the third layout;

generating an ACI image of a semiconductor film etched using the photomask as an etching mask; and adjusting the assist feature based on the ADI image of the photomask and the ACI image of the semiconductor film.

14. The method for fabricating the photomask layout of claim 13, wherein the adjusting the assist feature based on the ADI image of the photomask and the ACI image of the semiconductor film comprises:

reducing the size of the assist feature based on the assist feature being generated on the ACI image of the semiconductor film.

15. The method for fabricating the photomask layout of claim 13, wherein the adjusting the assist feature based on the ADI image of the photomask and the ACI image of the semiconductor film comprises:

changing a shape of the assist feature based on the assist feature being generated on the ACI image of the semiconductor film.

16. The method for fabricating the photomask layout of claim 13, wherein generating the ADI image of the photomask and generating the ACI image of the semiconductor film comprises:

generating the photomask using a 3D simulation.

17. The method for fabricating the photomask layout of claim 16, wherein generating the photomask comprise:

generating the photomask with a set thickness and a set material.

18. A method for manufacturing a semiconductor device, comprising:

receiving a first layout including a main pattern;

generating a second layout by generating an assist feature around the main pattern in consideration of optical properties of the main pattern;

generating a third layout by performing optical proximity correction on the second layout;

generating a photomask including at least a first layer, a second layer on the first layer, and a third layer on the second layer by using the third layout;

generating an after-development inspection (ADI) image of the first layer;

generating an after-cleaning inspection (ACI) image of the second layer;

generating an ACI image of the third layer;

generating, via a simulation, an ADI image of the photomask generated using the third layout and an ACI image of a semiconductor film etched using the photomask as an etching mask;

generating a corrected layout by adjusting at least one of a size or a shape of the assist feature of the third layout based on the assist feature being generated on the ACI image of the third layer;

generating the photomask using the corrected layout; and forming the semiconductor device using the photomask.

19. The method for manufacturing the semiconductor device of claim 18, wherein the photomask is generated based on the assist feature being generated on the ADI image of the photomask and not being generated on the ACI image of the semiconductor film.

* * * * *